United States Patent [19]
Taylor et al.

[11] Patent Number: 5,053,205
[45] Date of Patent: Oct. 1, 1991

[54] SOLAR PROPELLED CHEMICAL DISPENSER

[76] Inventors: Donald R. Taylor, 3525 E.St. John Rd.; Mark W. Kinzle, 17819 N. 35th Pl., both of Phoenix, Ariz. 85032

[21] Appl. No.: 481,878

[22] Filed: Feb. 20, 1990

[51] Int. Cl.$^5$ .............................................. B01D 11/02
[52] U.S. Cl. .................................... 422/265; 210/169; 210/198.1; 210/205
[58] Field of Search ................ 210/169, 198.1, 205, 210/754; 422/261, 265; 222/463

[56] References Cited

U.S. PATENT DOCUMENTS

| | | | |
|---|---|---|---|
| 3,684,460 | 8/1972 | Arneson | 210/169 |
| 3,758,276 | 9/1973 | Bond | 23/267 A |
| 3,792,979 | 2/1974 | Clinton | 23/267 A |
| 4,217,331 | 8/1980 | Schaub | 422/265 |
| 4,241,025 | 12/1980 | Grayson, IV et al. | 422/263 |
| 4,734,235 | 5/1988 | Holyoak | 422/264 |
| 4,798,707 | 1/1989 | Thomas et al. | 422/264 |

OTHER PUBLICATIONS

McGraw-Hill Encyclopedia of Sci. & Tech., 6th Edition, vol. 16, pp. 565–568, "Solar Cell", 1987.

*Primary Examiner*—Peter Hruskoci
*Assistant Examiner*—Robert James Popovics
*Attorney, Agent, or Firm*—David G. Rosenbaum

[57] ABSTRACT

A solar powered floatable chlorinating apparatus consisting of a floatable chamber which receives and contains the chlorine medium and dispenses solubilized chlorine into water entering into and dispersing from the chamber. A solar powered motor, operably associated with the floatable chamber, drives the floatable chamber randomly about the surface of the body of water.

18 Claims, 1 Drawing Sheet

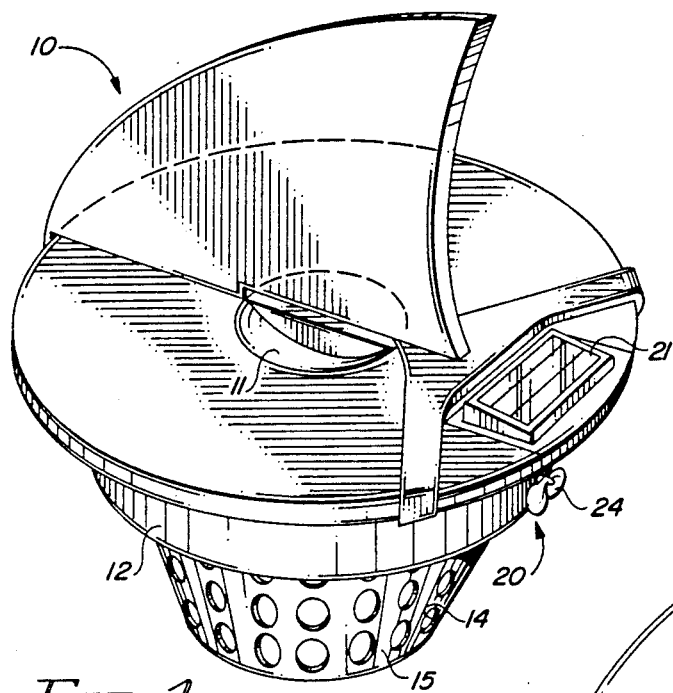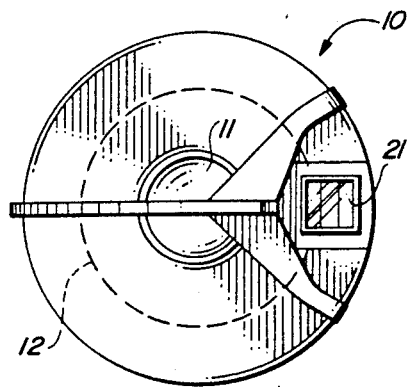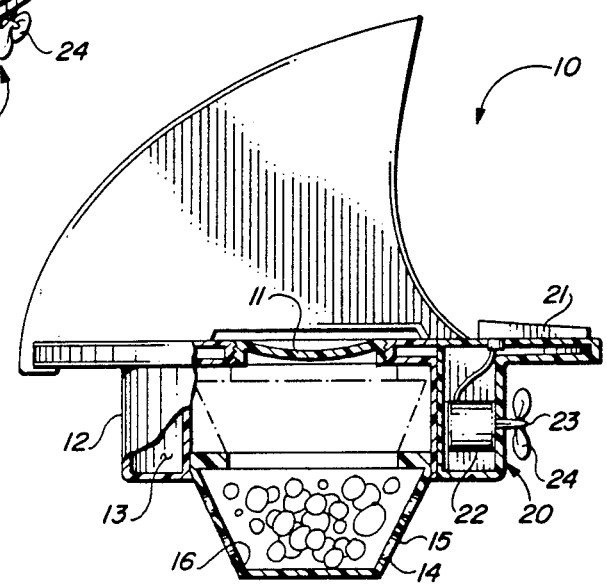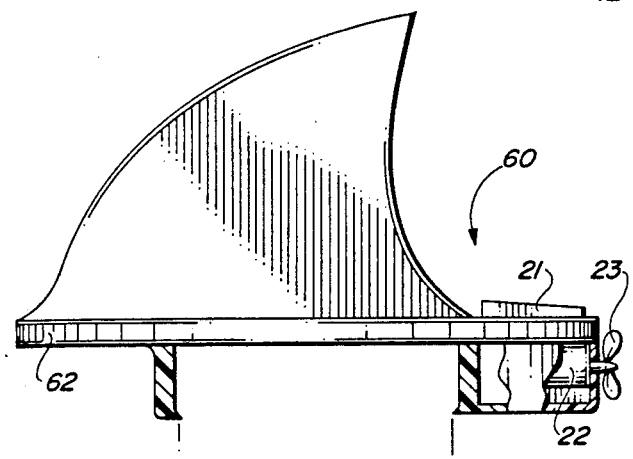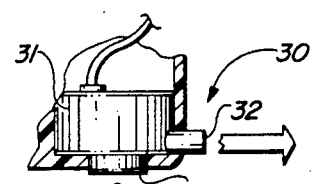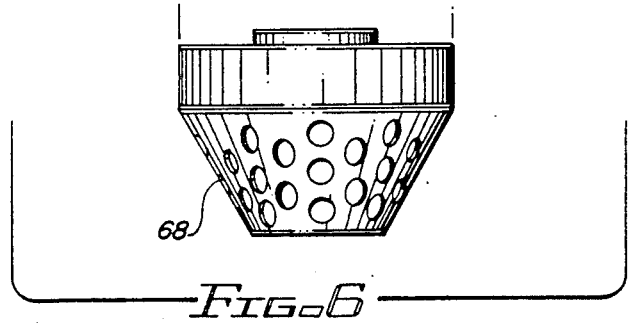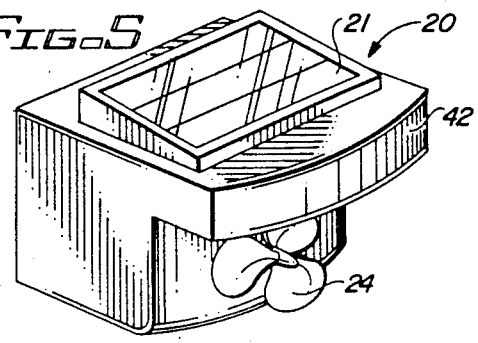

SOLAR PROPELLED CHEMICAL DISPENSER

BACKGROUND OF THE INVENTION

The invention relates generally to floatable chlorinating devices which contain chlorinating medium, such as chlorine tablets, and float on the surface of a body of water, such as a pool. More specifically, the present invention provides a powered floatable chlorinating apparatus consisting of a floatable chamber which receives and contains the chlorine medium and dispenses solubilized chlorine into water entering into and dispersing from the chamber. A motor, operably associated with the floatable chamber, drives the floatable chamber randomly about the surface of the body of water.

The vast majority of swimming pool owners use chlorine to maintain the swimming pool water free of bacteria and provide a safe and hygienic swimming atmosphere. There are a wide variety of ways to introduce chlorine into swimming pool water. The simple and most inexpensive solution is to manually chlorinate the water by introducing liquid or granulated chlorine directly into the water, or by introducing tabular or granular chlorine into the skimmer baskets associated with the pool equipment. This manual chlorination is a satisfactory means for chlorinating the pool water, but is frequently neglected by swimming pool owners. Numerous types of water propelled floating pool chlorinators are known in the art. Examples of such devices are found in U.S. Pat. No. 3,684,460 issued to H. M. Arenson on Aug. 15, 1972 and U.S. Pat. No. 3,758,276 issued to W. D. Bond, et al. on Sept. 11, 1973. Each of these chlorinating apparatus are characterized by a floatable body having at least one chamber for holding chlorine tablets depending from the floatable body such that the chlorine tablets are exposed by the pool water. In each of these apparatus, the floatable body is tethered to a source of pressurized water, such as a pressurized return, typically used with a variety of widely used automatic swimming pool cleaners. The pressurized water from the source is conducted to the floatable body whereupon, the chlorinating apparatus emits a water jet which propels the apparatus around the surface of the swimming pool. The principal disadvantages of these types of chlorinating apparatus are that they require the fluid conduit tether which obstructs the swimming area, and, therefore, cannot be used in swimming pools which do not use the required water pressure cleaning system, and are unsightly.

It has been determined, therefore, that to overcome these disadvantages of the prior art, it is desirable to provide a free-floating, self-propelled chlorinating apparatus. One attempt to provide such an apparatus is set forth in U.S. Pat. No. 4,798,707 issued to Thomas, et al. on Jan. 17, 1989. In that patent there is disclosed a sailboat chlorine dispenser consisting of a small sailboat-shaped floatable body, having a keel depending from the body and a chlorine tablet chamber depending from the lower end of the keel. The chlorine tablet chamber consists generally of a circular chamber having a plurality of vertical slots provided about the circumference of the chamber, each of the slots have an associated spring-loaded door which opens in response to the flow of water past the chamber. The sole means for creating a flow of water past the chamber is air flows against the sails on the floatable body. It will be apparent to those skilled in the art, however, that without wind, there is no driving force to impart motion to the floatable body. Hence, there will be no water flow past the vertical slots. Accordingly, only localized areas of the pool will be exposed to chlorine, and the very purpose of the chlorinating apparatus will be defeated. Moreover, the arrangement of spring-loaded doors associated with the vertical slots is cumbersome to manufacture, and complex and unreliable in use.

SUMMARY OF THE INVENTION

Accordingly, it is a broad object of the present invention to provide a chlorinating apparatus which is free-floating, without need for attachment to pressurized water as the drive source for coverage of the entire water body, self-powered to provide motive force propelling the apparatus randomly about the surface of the water body, permits free diffusion of chlorine, or other purifying chemical such as bromine, into the water body, and is safe to use.

Specifically, to accomplish this broad objective, the present invention consists of a floatable body defining at least one interior chamber, for receiving and containing chlorine tablets or other water purifying media, having a plurality of openings in at least a lower part of the interior chamber which permit the free flow of water into the chamber, exposure to the purifying media, and free flow of solubilized chlorine or purifying media out of the chamber. A drive system, such as a solar powered motor/propeller unit or water jet pump, is associated with the floatable body to provide motive force to propel the chlorinating apparatus about the entire surface of the water body.

In accordance with another object of the invention, an interior baffle is provided in the at least one interior chamber. The interior baffle seals the openings in the interior chamber when the entire chlorinating apparatus is removed from the water body, thereby sealing highly chlorinated water within the interior chamber. The provision of the interior baffle is an important safety aspect of the invention.

In accordance with yet another object of the present invention, a decorative lid, such as a sharks fin, an animal sculpture, an abstract sculpture, etc., is provided on top of the chlorinating apparatus to beautify the visible portions of the apparatus when it is in the water body.

These and other objects, features and advantages of the invention will become more apparent to those skilled in the art from the following, more detailed description of the preferred embodiments of the present invention with reference to the accompanying figures, in which like reference numerals identify like features.

BRIEF DESCRIPTION OF THE FIGURES

FIG. 1 is a perspective view of the chlorinating apparatus of the present invention.

FIG. 2 is a top elevational view of the chlorinating apparatus of the present invention.

FIG. 3 is a side elevational partial cross-sectional view of the chlorinating apparatus taken along line 3—3 of FIG. 1.

FIG. 4 is a fragmentary partial cross-sectional view of a drive system according to the present invention.

FIG. 5 is a perspective view of a drive system disassociated from the floating chlorinator apparatus of the present invention.

FIG. 6 is a side-elevational partial cross-sectional view of an alternative preferred embodiment of the invention illustrating a retro-fit drive system for conventional floatable chlorinators.

DETAILED DESCRIPTION OF THE PREFERRED EMBODIMENTS

Turning to FIGS. 1 and 2 of the accompanying figures, there is shown a chlorinating apparatus 10 in accordance with a preferred embodiment of the present invention. Specifically, chlorinating apparatus 10 consists of a floatable body 12 defining a interior chamber 16. Floatable body 12 has a lower porous portion 14 depending therefrom. Lower porous portion 14 has a plurality of apertures disposed in the walls to permit the free-flow of fluid, such as water, into and out of the interior chamber 16. Chlorinating tablets, or other purifying medium such as bromine, may be inserted into interior chamber 16 through a lid 11 associated with the floatable body 12.

According to a preferred embodiment of the present invention, floatable body 12 is further provided with an interior buoyancy chamber 13, which may be filled with any buoyant material, such as an open or closed cell foam material, to permit the entire chlorinating apparatus 10 to float. Counterbalances, as are known in the art, may be employed as needed to ensure proper balance of the apparatus 10 when floating.

A drive system 20 is operably coupled to the floatable body 12 and provides a motivating force to propel the floatable body about the surface of the water body. In accordance with the preferred embodiment of the present invention, drive system 20 consists of a solar panel 21 of sufficient size and electrical output to drive an electrical motor 22 operably connected to either a propeller 24 or, as shown in FIG. 3, a water jet pump 30. It has been found, for example, that a solar panel 21 having about a 1.5 to 3.0 volt output at about 500 milliamps provides sufficient electrical power to drive a suitable motor.

Solar panel 21 is preferably mounted on an exterior surface of floatable body 12 such that it is positioned to optimally receive sunlight. Drive system 20 is preferably disposed within a buoyancy chamber 13 and electrically connected to solar panel 21. According to one preferred embodiment of the invention, as illustrated in FIG. 2, drive system 20 is operably connected to a drive shaft 23 protruding through an aperture in buoyancy chamber 13, sealed with a suitably water tight shaft seal, and connected to a propeller blade 24. In accordance with an alternative preferred embodiment, illustrated with reference to FIG. 3, drive system 20 consists of a motor 30, also electrically connected to solar panel 21 (not shown), which drives a recirculating pump 31 having a water intake port 34 and a water output port 32 operably associated with the external wall of buoyancy chamber 13 and in fluid flow communication with the water outside the chlorinating apparatus 10.

With particular reference to FIG. 3, in accordance with all preferred embodiments of the invention, though not crucial to the proper function and operation of the chlorinating apparatus 10, a flow restrictor device 15 is disclosed. Flow restrictor 15 is disposed within interior chamber 16 to prevent release of highly chlorinated water from interior chamber 16 upon removal of the chlorinating apparatus 10 from the water body. Flow restrictor 15 provides a measure of safety, to restrict the outflow of highly chlorinated water onto the skin or into the eyes of children or unsuspecting adults upon removal of the chlorinating apparatus from the water.

Flow restrictor 15 comprises an inverted container, having an open lower portion and a sealed upper portion. A buoyant material, such as an open or closed cell foam material, is associated with the sealed upper portion of the inverted container. When the chlorinating apparatus 10 is placed in the water, the buoyant material will cause the inverted container to float to the top of interior chamber 16, thereby permitting the free flow of water into and out of the lower portion 14 of floatable body 12. When, however, the chlorinating apparatus 10 is withdrawn from the water, the inverted container will be lowered and seal the lower portion 14 of floatable body 12, such that highly chlorinated water will be contained within the inverted container.

Those skilled in the art will understand that the flow restrictor device 15 is preferably configured such that the side walls are in close proximity with the walls defining interior chamber 16 of the floatable body 12, and cooperate with interior chamber 16, in any manner as is well known in the art, to permit free movement of the flow restrictor device 15 along the vertical axis of interior chamber 16. Suitable configuration may include, for example, a series of grooves provided in the wall of interior chamber 16 and associated guide projections protruding outwardly from the walls of the flow restrictor 15 which operably cooperate with the series of grooves, or a double-walled lower portion 14 of the floatable body, wherein the walls of floatable body 15 are interdisposed between the double-walls of the lower portion 14, and vertically movable therebetween.

Turning to FIG. 4, there is disclosed an embodiment of a drive system comprising a water jet pump 30 having a pump motor 31 electrically coupled to the solar panel 21, a water intake port 34 and a water output port 32. Water surrounding the chlorinating apparatus 10 is drawn into water jet pump 30 and emitted under pressure from water output port 32, thereby providing a driving force to propel the chlorinating apparatus about the water body.

With reference to FIG. 5, there is shown a discrete removable drive system assembly 20. Drive system assembly 20 consists of a motor housing 42 which contains the drive system motor (not shown) and is operably coupled to both the solar cell 20 and the drive means 24, such as a propeller or a water jet 30. As the drive system assembly 20 is the only electro-mechanical component of the chlorinating apparatus 10, it is desirable, though not required under the scope of the invention, to provide the drive system assembly 20 as a discrete assembly removable from the chlorinating apparatus 10. Any suitable means for attaching and securing the removable drive system assembly 20 may be employed, such as a snap fit coupling between the chlorinating apparatus 10 and the drive system assembly 20.

Finally, with reference to FIG. 6, there is shown a retrofit drive system 60 adapted to operably couple to existing floating chlorinators 68. Retro-fit drive system 60 consists of a floatable body 62 adapted to operably couple to a floating chlorinator 68. Floatable body 62 may have associated counter balances, as hereinbefore described, to assure level floatation. Coupled to the retro-fit drive system is a solar panel 21 electrically coupled to a drive system motor 22 which, in turn drives either a propeller or a jet pump as hereinbefore described.

While the chlorinating apparatus 10 of the present invention has been particularly disclosed and described with reference to the preferred embodiments thereof, those skilled in the art will understand and appreciate that various alterations in structure, materials and function may be made and remain with the spirit and scope of the present invention, as represented and limited only with reference to the accompanying claims.

What is claimed is:

1. A dispenser for releasing soluble chemicals into a body of water, comprising:
   a floatable body;
   a container member having a plurality of apertures passing therethrough, said container being operably associated with said floatable body and defining an interior chemical receiving chamber within said container;
   active propulsion drive means, operably coupled to said floatable body, for imparting horizontal motion to said floatable body on the surface of the body of water; and
   solar power means, electrically coupled to said drive means, for receiving solar energy, converting said received solar energy to electrical energy, and supplying said electrical energy to said drive means.

2. The dispenser according to claim 1, wherein said floatable body further comprises an annular ring-shaped container defining a central opening, an internal chamber within said container and a buoyant material provided within said internal chamber.

3. The dispenser according to claim 2, wherein said annular ring-shaped container further comprises a cover member coupled to a top surface of said annular ring-shaped container, said cover member further having a central opening therein in communication with the central opening of said annular ring-shaped container.

4. The dispenser according to claim 3, wherein said central opening of said cover member further has a removable lid member operably coupled thereto.

5. The dispenser according to claim 1, wherein said interior chemical receiving chamber further comprises a soluble chemical basket member having a plurality of openings therein, depending from said floatable body, and a floatable envelope member coaxially positioned in said soluble chemical basket member.

6. The dispenser according to claim 1, wherein said drive means further comprises a drive motor disposed within said floatable body, a drive shaft operably coupled to said drive motor and extending external to said floatable body and a propeller blade coupled to said drive shaft.

7. The dispenser according to claim 1, wherein said active propulsion drive means further comprises a fluid jet pump having a pump motor, a fluid intake port and a fluid outlet port, each of said fluid intake port and said fluid outlet port being in fluid flow communication with the body of water, wherein said fluid outlet port is positioned to direct a fluid flow in a first direction away from said floatable body, thereby propelling said floatable body in a second direction which is substantially opposite to said first direction.

8. The dispenser according to claim 1, wherein said active propulsion drive means and said solar power means are configured as a discrete unit removably engageable with said floatable body.

9. The dispenser according to claim 1, wherein said dispenser further comprises a decorative member coupled to said floatable body and extending upwardly therefrom.

10. A chemical dispensing apparatus, comprising:
    a floatable body comprising an annular ring-shaped container defining a central opening, an internal chamber within said container and a buoyant material provided within said internal chamber;
    a container member comprising an envelope member coupled to and depending from said floatable body, said envelope member having a plurality of openings therein and defining an interior chemical receiving chamber therein, and a floatable sealing member coaxially positioned in said interior chemical receiving chamber, such that when the apparatus is withdrawn from a body of water, said floatable sealing member seals said plurality of openings in said envelope member;
    active propulsion drive means, operably coupled to said floatable body, for imparting lateral motion to said floatable body with respect to a surface of a body of water; and
    solar power means, electrically coupled to said drive means, for receiving solar energy, converting said received solar energy to electrical energy, and supplying said electrical energy to said drive means.

11. The dispenser according to claim 10, wherein said annular ring-shaped container further comprises a cover member coupled to a top surface of said annular ring-shaped container, said cover member further having a central opening therein in communication with the central opening of said annular ring-shaped container.

12. The dispenser according to claim 10, wherein said central opening of said cover member further has a removable lid member operably coupled thereto.

13. The dispenser according to claim 10, wherein said active propulsion drive means further comprises a drive motor disposed within said floatable body, a drive shaft operably coupled to said drive motor and extending external to said floatable body and a propeller blade coupled to said drive shaft.

14. The dispenser according to claim 10, wherein said active propulsion drive means further comprises a fluid jet pump having a pump motor, a fluid intake port and a fluid outlet port, each of said fluid intake port and said fluid outlet port being in fluid flow communication with the body of water, wherein said fluid outlet port is positioned to direct a fluid flow in a first direction away from said floatable body, thereby propelling said floatable body in a second direction which is substantially opposite to said first direction.

15. The dispenser according to claim 10, wherein said solar power means is mounted upon said floatable body.

16. The dispenser according to claim 10, wherein said active propulsion drive means and said solar power means are configured as a removable unit adapted to operably engage and disengage from said floatable body.

17. The dispenser according to claim 10, wherein said dispenser further comprises a decorative member coupled to said floatable body and extending upwardly therefrom.

18. A dispenser for releasing soluble chemicals into a body of water, comprising:
    a floatable body;
    a container member having a plurality of apertures passing therethrough, said container being operably associated with said floatable body and defining an interior chemical receiving chamber within said container;

active propulsion drive means, operably coupled to said floatable body, for imparting horizontal motion to said floatable body on the surface of the body of water, comprising a drive motor disposed within said floatable body, a drive shaft operably coupled to said drive motor and extending external to said floatable body and a propeller blade coupled to said drive shaft; and solar power means, electrically coupled to said drive means, for receiving solar energy, converting said received solar energy to electrical energy, and supplying said electrical energy to said drive means.

* * * * *